United States Patent
Forgette

(10) Patent No.: US 8,261,268 B1
(45) Date of Patent: Sep. 4, 2012

(54) SYSTEM AND METHOD FOR DYNAMIC ALLOCATION OF VIRTUAL MACHINES IN A VIRTUAL SERVER ENVIRONMENT

(75) Inventor: Eric P. Forgette, Mechanicsville, VA (US)

(73) Assignee: NetApp, Inc., Sunnyvale, CA (US)

( * ) Notice: Subject to any disclaimer, the term of this patent is extended or adjusted under 35 U.S.C. 154(b) by 676 days.

(21) Appl. No.: 12/535,993

(22) Filed: Aug. 5, 2009

(51) Int. Cl.
*G06F 9/455* (2006.01)
(52) U.S. Cl. .......................................................... 718/1
(58) Field of Classification Search .................. None
See application file for complete search history.

(56) References Cited

U.S. PATENT DOCUMENTS

| | | | | |
|---|---|---|---|---|
| 5,530,860 | A * | 6/1996 | Matsuura | 718/105 |
| 6,223,202 | B1 * | 4/2001 | Bayeh | 718/102 |
| 8,065,676 | B1 * | 11/2011 | Sahai et al. | 718/1 |
| 2004/0148602 | A1 * | 7/2004 | Ottati | 718/1 |
| 2005/0262507 | A1 * | 11/2005 | Langen et al. | 718/100 |
| 2009/0260008 | A1 * | 10/2009 | Cho et al. | 718/1 |
| 2010/0251237 | A1 * | 9/2010 | Coyle et al. | 718/1 |

OTHER PUBLICATIONS

Murphy, Michael A., Kagey, Brandon, Fenn, Michael, Goasguen, Sebastien. "Dynamic provisioning of virtual organization clusters" In 2009 9th IEEE/ACM International Symposium on Cluster Computing and the Grid (CCGrid 2009), May 18-21, 2009.*
U.S. Appl. No. 12/283,163, filed Sep. 9, 2008, Raphael Yahalom, et al.
U.S. Appl. No. 12/339,733, filed Dec. 19, 2008, Raphael Yahalom, et al.

* cited by examiner

Primary Examiner — Jacob A Petranek
(74) Attorney, Agent, or Firm — Stattler-Suh PC

(57) ABSTRACT

A system and method for dynamically producing virtual machines (VMs) across a plurality of servers in the virtual server environment is provided. A single VM request queue is produced comprising VM requests for producing the plurality of VMs. A processing thread is produced and assigned for each server and retrieves VM requests from the VM request queue and produces VMs only on the assigned server according to the retrieved VM requests. Each processing thread may be configured for retrieving VM requests and producing VMs without any programmed delays, whereby the rate at which a processing thread produces VMs on its assigned server is a function of the performance capabilities of the assigned server. This dynamic allocation of VMs based on such a "natural selection" technique may provide an appropriately balanced allocation of VMs based on the performance capabilities of each server in the virtual server environment.

22 Claims, 10 Drawing Sheets

SYSTEM AND METHOD FOR DYNAMIC ALLOCATION OF VIRTUAL MACHINES IN A VIRTUAL SERVER ENVIRONMENT

FIELD OF THE INVENTION

The present invention relates to virtual server environments and, more specifically, to dynamic allocation of virtual machines in a virtual server environment.

BACKGROUND OF THE INVENTION

A virtual server environment may typically include multiple physical servers accessing a storage system having multiple storage devices for storing client data. Each server may include multiple virtual machines (VMs) that reside and execute on the server. Each VM (sometimes referred to as a virtual server or virtual desktop) may comprise a separate encapsulation or instance of a separate operating system and one or more applications that execute on the server. As such, each VM on a server may have its own operating system and set of applications and function as a self-contained package on the server and multiple operating systems may execute simultaneously on the server.

Each VM on a server may be configured to share the hardware resources of the server. Each server may include a VM monitor module/engine (sometimes referred to as a hypervisor module/engine) that executes on the server to produce and manage the VMs. The VM monitor module/engine (hypervisor) may also virtualize the hardware and/or software resources of the servers for use by the VMs. The operating system of each VM may utilize and communicate with the resources of the server via the VM monitor/hypervisor engine. The virtual server environment may also include a plurality of clients connected with each server for accessing client data stored on the storage system. Each client may connect and interface/interact with a particular VM of a server to access client data of the storage system. From the viewpoint of a client, the VM may comprise a virtual server that appears and behaves as an actual physical server or behaves as an actual desktop machine. For example, a single server may by "virtualized" into 1, 2, 4, 8, or more virtual servers or virtual desktops, each running their own operating systems, and each able to support one or more applications.

A storage system may be configured to allow servers to access its data, for example, to read or write data to the storage system. A server may execute an application that "connects" to the storage system over a computer network such as a shared local area network (LAN), a wide area network (WAN), or a virtual private network (VPN) implemented over a public network such as the Internet. The application may send an access request (read or write request) to the storage system for accessing particular data stored on the storage system. Each server may also include multiple VMs, each VM being used by and connected with a client through a computer network. Each VM may also execute an application for sending read/write requests (received from the connected client) for accessing data on the storage system. The VM applications executing on the server may service the connected clients by receiving the client access requests and submitting the access requests to the storage system for execution.

There are several advantages in implementing VMs on a server. Having multiple VMs on a single server enables multiple clients to use multiple different operating systems executing simultaneously on the single server. Also, multiple VMs executing their own applications may be logically separated and isolated within a server to avoid conflicts or interference between the applications of the different VMs. As each VM is separated and isolated from other VMs, a security issue or application crash in one VM does not affect the other VMs on the same server. Further, VMs may be rapidly cloned and deployed and easily transferred between servers in the virtual server environment.

Virtual server environments are increasingly supporting a larger number of clients/users and VMs in enterprises. As a result, these virtual server environments are becoming increasingly large and complex. This increasing complexity is compounded by the heterogeneity of the different server types, different server manufacturers, different server configurations, and different storage requirements. Manual management techniques have proven to produce high errors and inefficiencies. For example, changes to the virtual server environment, which may happen frequently often due to rapid hardware and software life cycles, take a long time to complete using manual methods, and manual methods have proven to be error-prone.

The complexity of virtual server environments is further complicated by the increasing adoption of networked storage within virtual server environments (as disclosed in commonly-assigned U.S. patent application Ser. No. 12/283,163 filed on Sep. 9, 2008, the contents of which are incorporated herein in its entirety). VMs can rapidly and seamlessly be shifted from one physical server to any other server, and optimally utilize the resources without affecting the applications. Such a virtualization of the servers, and/or virtualization of the storage network environment, allows for efficiency and performance gains to be realized. These gains may be realized in terms of service-level metrics or performance metrics, e.g., storage capacity utilization, server utilization, CPU utilization, data traffic flow load balancing, etc.

In general, the goal of virtual server environment administrators is to maximize overall resource utilization (among all the hardware resources spread across the multiple servers of the virtual server environment) while meeting predetermined application performance goals. As each VM on a server consumes resources and adds to the workload of the server, maximizing resource utilization includes balancing the allocation of VMs to appropriately spread the added workload among the servers while meeting predetermined application performance goals. For example, a high performance, highly resourced server may be capable of hosting and executing 100 VMs, while an older, lower performing server may host only 50 VMs while still meeting the predetermined application performance goals.

The difference in performance of different VM applications executing on different physical servers may be due to a variety of reasons that may be difficult to determine. The performance of a VM application executing on a particular server may be a function of many hardware or software variables of the server, including processor speed, memory size, number and type of network adapters, performance of a storage subsystem, etc. In many virtual server environments, however, there may be a reduction in application performance because too many VMs may be allocated to a lower performing server, while too few VMs may be allocated to another more capable server. As a result, the overall resources of the virtual server environment (spread across the multiple physical servers) are not fully utilized in an efficient manner.

Conventionally, static techniques for allocating VMs to servers have been used. Static techniques may comprise pre-determining a specific number of new VMs to be allocated to each physical server in the virtual server environment. Static techniques may also attempt to predict or model the performance of each server to determine how many new VMs to be allocated to each server. For example, based on the performance predictions, it may be predetermined that 150 new VMs be allocated to a first physical server and 50 new VMs be allocated to a second physical server.

Given that the application performance of a server may be a function of many hardware or software variables, the complexity involved in modeling performance of a server may often produce inaccurate performance predictions. As such, typically, once the VMs are allocated to servers and deployed for use by clients, static techniques result in an unbalanced deployment where too many VMs are allocated to a slower performing server and too few VMs are allocated to a faster performing server and often requires VMs to later be migrated among the servers. The complexity involved in modeling performance of a physical server is also increased when application-access requirements to data on a storage system and storage system performance is also taken into account.

Static techniques that allocate predetermined numbers of VMs to particular servers, even those that model server performance and storage system performance, may still typically produce unbalanced allocation of VMs and require later migration of the VMs among the servers. As such, there is a need for an improved method of allocating VMs to servers in a virtual server environment.

SUMMARY OF THE INVENTION

Described herein are systems and methods for automatic and dynamic virtual machine (VM) allocation for allocating a plurality of VMs to a plurality of servers in a virtual server environment. In some embodiments, a shared single VM request queue is produced that comprises a plurality of VM requests for producing the plurality of VMs across the plurality of servers. A processing thread may be produced and assigned for each server in the plurality of servers and execute on the corresponding assigned server. Each processing thread may be configured for accessing and retrieving VM requests from the shared single VM request queue and producing VMs only on the corresponding assigned server according to the retrieved VM requests.

Each processing thread may be configured for retrieving VM requests and producing VMs as rapidly as possibly allowed by the performance capabilities of the assigned server without any programmed/configured delays (e.g., waiting for other processing threads from other servers, etc.). In some embodiments, the processing thread may produce the VMs in conjunction with the hypervisor module/engine on the same server. For example, the processing thread may submit a request to the hypervisor module to produce a VM on the server, and the hypervisor in turn receives VM requests from the processing thread. As such, the speed or rate at which VMs are produced on a server are dependent on and are a function of the speed or rate the server can actually execute (in "real-world" settings) the processing thread to retrieve VM requests from the VM request queue and execute the processing thread and hypervisor module to produce the VMs. Thus, the final number of VMs produced on a particular server (after all VM requests from the VM request queue are processed by the servers) is dependent on and is a function of the rate that the server can retrieve VM requests from the VM request queue and produce the VMs.

As such, as described herein, the rate at which a server (executing a processing thread and hypervisor module) produces VMs on the server will largely be a function of the "real-world" performance capabilities of the server, whereby servers having relatively higher/faster performance capabilities (e.g., newer servers, or servers under less load, or servers with more resources) will naturally have more VMs produced on them by its corresponding processing thread than servers having relatively lower/slower performance capabilities (e.g., servers under heavy load, running a large number of legacy VMs, or servers with fewer resources). This dynamic allocation of VMs based on such a "natural selection" technique may provide an appropriately balanced allocation of VMs across a plurality of servers based on the actual "real-world" performance capabilities of each server.

In some embodiments, a VM manager module/engine executing on a "host" server in the virtual server environment is configured for performing some of the dynamic VM allocation techniques described herein. The virtual server environment may also include one or more "target" servers on which one or more new VMs are produced. Note that the host server may also comprise a target server. In these embodiments, the VM manager module may be configured for receiving VM parameters including a total number of VMs to be produced across the plurality of servers in the virtual server environment. In some embodiments, the VM parameters do not specify a predetermined number of VMs to be produced on any specific server (static VM allocation). The VM parameters may further include data specifying/describing each VM that is to be produced, wherein the data regarding a VM does not specify a specific target server on which the VM is to be allocated and produced. As such, each specified VM may be produced on any of the target servers in the plurality of target servers. Rather, a total number of VMs and data describing the VMs to be produced across the target servers is received, and the number of VMs ultimately produced on each target server is dynamically determined based on the real-world performance capabilities of each target server.

In some embodiments, the VM manager module is configured for producing the single VM request queue comprising a plurality of VM requests. Each VM request represents a VM specified in the received VM parameters and contains data describing the VM to be produced. The VM request queue may be stored on the host server. In some embodiments, the VM manager module may produce, or cause to be produced, a processing thread corresponding to each target server, the processing thread executing on its corresponding target server for retrieving VM requests from the VM request queue and producing VMs only on its corresponding assigned target server. The single VM request queue may be configured for being accessible by the plurality of processing threads executing on the plurality of target servers to produce VMs in parallel in the target servers. In some embodiments, a VM request representing a VM does not specify any specific target server on which the VM is to be allocated and produced. As such, a VM request is configured such that it may be processed by any processing thread plurality of processing threads for producing a VM on any target server in the plurality of target servers depending on which processing thread of which assigned target server retrieves the VM request from the VM request queue.

In some embodiments, some components (e.g., VM manager module and VM request queue) of a system for dynamic VM allocation are implemented on a general-purpose host server. In other embodiments, some components of the system for dynamic VM allocation are implemented on a storage system. In further embodiments, some components of the system for dynamic VM allocation are implemented on a general-purpose client system.

BRIEF DESCRIPTION OF THE DRAWINGS

The novel features are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form in order to not obscure the description with unnecessary detail.

The description that follows is divided into three sections. Section I describes a virtual server environment in which some embodiments operate. Section II describes an apparatus for dynamic VM allocation in virtual server environments. Section III describes methods for dynamic VM allocation in virtual server environments.

I. Virtual Server Environment

Figure 1:
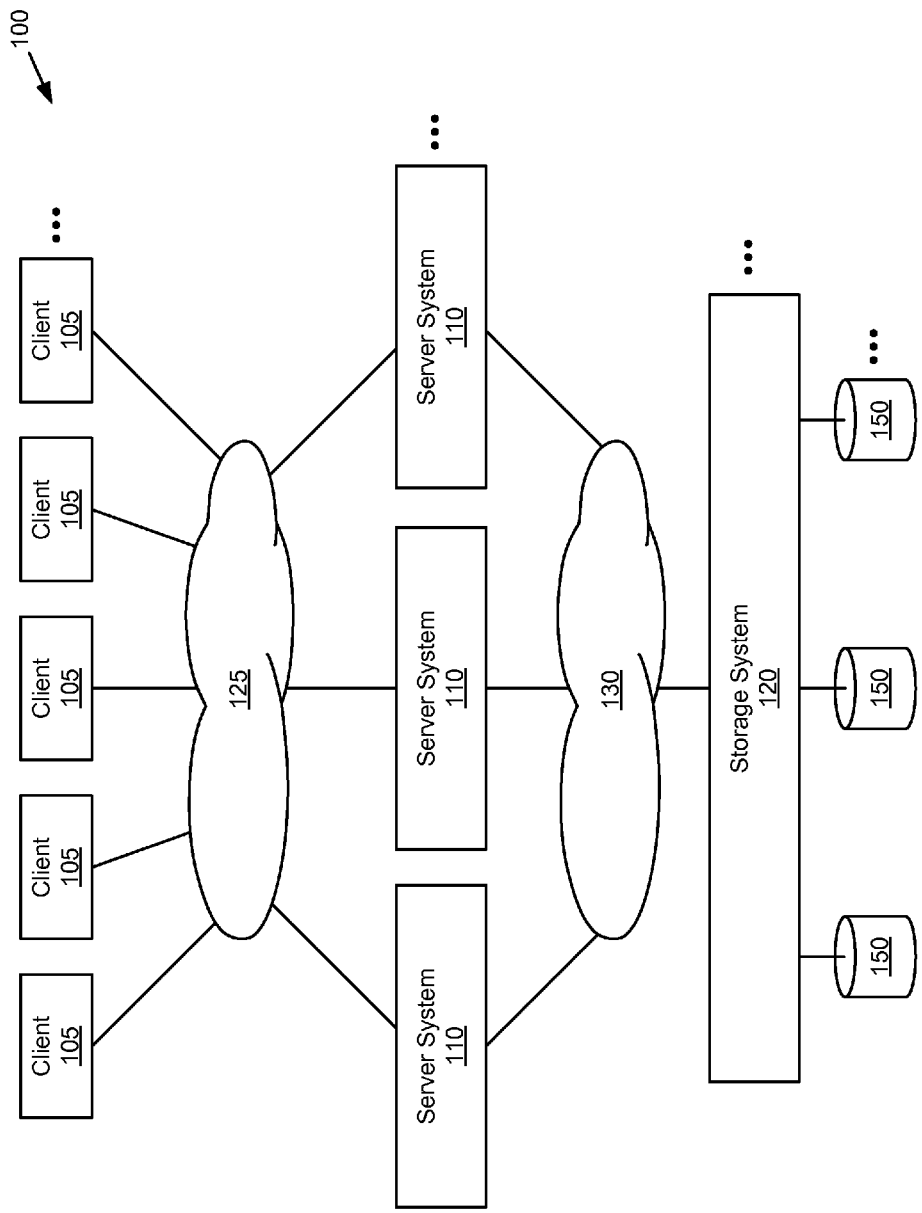
FIG. 1 is a block diagram of an exemplary virtual server environment in which some embodiments operate.

FIG. 1 is a block diagram of an exemplary virtual server environment 100 in which some embodiments operate. The environment 100 comprises a set of two or more server systems 110 connected to one or more client systems 105 via a network 125. The server systems 110 may each access one or more storage systems 120 (each storage system 120 having a set of one or more storage devices 150) that are connected to the server systems 110 via a network 130. Note that the server systems 110 are also connected to each other (e.g., via network 125 or network 130) for communicating with each other (e.g., for working collectively to provide data-access service to the client systems 105 and for collectively hosting a plurality of virtual machines as described herein).

A client system 105 may comprise a computer system that may execute a client application that interacts with a server system 110 for submitting configuration and/or read/write access requests and for receiving or transmitting data from or to the server systems 110 over the network 125. In a virtual server environment, a client system 105 may comprise a terminal that may execute a client terminal application that interacts over the network 125 with one or more virtual machines (VMs) executing on a server system 110 for submitting configuration and/or read/write access requests and for receiving or transmitting data from or to the storage system 120 over the network 130. A user may interface with the client application (e.g., through a user interface of the client application) to submit configuration and/or access requests.

A server system 110 may comprise a computer system that may execute a server application that interacts with the client systems 105 for receiving configuration and/or read/write access requests from, and for receiving or transmitting data from or to the client systems 105 over the network 125. A server system 110 may be connected to the client systems 105 over a network 125 such as a local area network (LAN), an Ethernet subnet, a PCI or PCIe subnet, a switched PCIe subnet, a wide area network (WAN), a metropolitan area network (MAN), the Internet, or the like. In some embodiments, a server system 110 may comprise a chassis hosting multiple instances of server systems 110, each server system 110 hosting multiple client systems embodied as virtual machines, one virtual machine per each client system 105. The network 125 and/or subnets of networks 125 may be physically embodied within such a chassis.

A server application executing on a server system 110 may provide data-access services to client systems 105 by receiving and processing access requests from the client systems 105 for data from the storage system(s) 120. In turn, a server application utilizes the services of the storage system 120 to access, store, and manage data in a set of storage devices 150. A storage system 120 may be coupled locally to a server system 110 over a network 130 such as a local area network (LAN), an Ethernet subnet, a PCI or PCIe subnet, a switched PCIe subnet, a wide area network (WAN), a metropolitan area network (MAN), the Internet, or the like. In fact in some embodiments, a server system 110 may comprise a chassis hosting multiple instances of server systems 110 within a single chassis (e.g., a blade server chassis), with each instance of a server system 110 in communication with each other instance of a server system 110 in the chassis via network 130.

Interaction between the server systems 110 and the storage system(s) 120 can enable the provision of storage services. That is, the server systems 110 may request the services of the storage system(s) 120 (by submitting configuration and/or read/write access requests), and the storage system(s) 120 may respond to configuration and/or read/write access requests of the server systems 110 by receiving or transmitting data to the server systems 110 over the network 130 (e.g., by exchanging data packets through a connection over the network 130).

Communications between a storage system 120 and any of server systems 110 are typically embodied as packets sent over the computer network 130. A server system 110 may send an access request (a configuration and/or read/write access request) to the storage system 120 for accessing particular data stored on the storage system. The server system 110 may request the services of the storage system 120 by issuing storage-access protocol messages formatted in accordance with a conventional storage-access protocol for accessing storage devices (such as CIFS, NFS, etc.). Access requests (e.g., configuration and/or read/write access requests) may be implemented by issuing packets using file-based access protocols—such as the Common Internet File System (CIFS) protocol or Network File System (NFS) protocol—over the Transmission Control Protocol/Internet Protocol (TCP/IP) when accessing data in the form of files and directories. Alternatively, the server system 110 may issue access requests by issuing packets using block-based access protocols—such as the Fibre Channel Protocol (FCP), or Internet Small Computer System Interface (iSCSI) Storage Area Network (SAN) access—when accessing data in the form of blocks.

A server system 110 utilizes services of a storage system 120 to store and manage data. The storage system 120 may comprise a computer system that stores data in a set of one or more storage devices 150. A storage device 150 may comprise writable storage device media such as disk devices, video tape, optical devices, DVD, magnetic tape, flash memory, Magnetic Random Access Memory (MRAM), Phase Change RAM (PRAM), or any other similar media adapted to store information (including data and parity information).

As known in the art, a storage device 150 may have one or more storage volumes, where each volume has a file system implemented on the volume. A file system implemented on the storage devices 150 may provide multiple directories in a single volume, each directory containing zero or more filenames. A file system provides a logical representation of how data (files) are organized on a volume where data (files) are represented as filenames that are organized into one or more directories. Examples of common file systems include New Technology File System (NTFS), File Allocation Table (FAT), Hierarchical File System (HFS), Universal Storage Device Format (UDF), UNIX® file system, and the like. For the Data ONTAP® storage operating system (available from NetApp, Inc. of Sunnyvale, Calif.) which may implement a Write Anywhere File Layout (WAFL®) file system, there is typically a WAFL file system within each volume, and within a WAFL file system, there may be one or more logical unit numbers (LUNs).

II. Apparatus for Dynamic VM Allocation in Virtual Server Environments

Figure 2A:
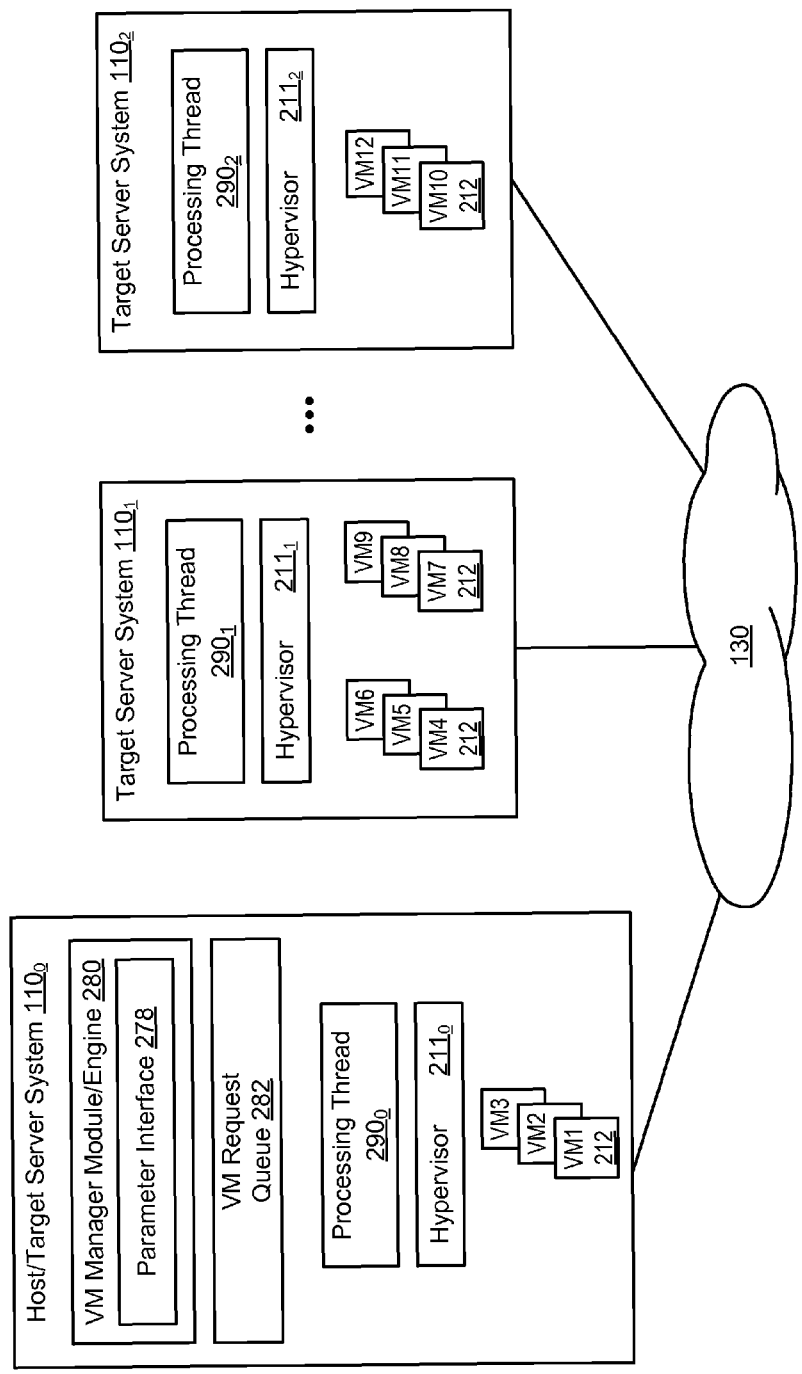
FIG. 2A shows a conceptual diagram of components of a host server and target servers within a virtual server environment, in accordance with some embodiments.

FIG. 2A is a diagram illustrating a system of various components of a host/target server system $110_0$ and target server systems $110_1$, and $110_2$, in accordance with some embodiments. As shown in FIG. 2A, the host/target server system $110_0$ and the two target server systems $110_1$ and $110_2$ are in communication over network 130. As such, any component shown within any of the host/target server systems $110_0$, and/or within any of the two target server systems $110_1$ and $110_2$, may be in communication with one another over network 130.

In some embodiments, the virtual server environment includes multiple species of server systems 110 including a host server system 110, a target server system (e.g., servers $110_1$, $110_2$), or a combination of the two species (e.g., host/target server system $110_0$). As used herein, a "host" server system contains and executes a VM manager module/engine that causes one or more VMs to be produced on each "target" server system using dynamic VM allocation techniques. In some embodiments, the virtual server environment comprises at least one host server system and at least two target server systems. Note that a host server system may also comprise a target server system (host/target server system), whereby the host server system (through use of the VM manager module/engine) causes VMs to be produced onto itself. For example, the virtual server environment may comprise a total of three separate server systems: one host server system and two target server systems. As a further example, the virtual server environment may comprise a total of two separate server systems: one combination host/target server system and one target server system.

Each target server 110 may include a VM monitor module/engine 211 (e.g., $211_0$, $211_1$, $211_2$) and a processing thread 290 (e.g., $290_1$ and $290_2$) that execute on the target server 110 to work in conjunction to produce VMs 212 (e.g., VM1, VM2, . . . VM12) on the target server. The VM monitor module/engine 211 may also manage the VMs 212 and virtualize the hardware and/or software resources of the servers for use by the VMs 212. The operating system of each VM may utilize and communicate with the resources of the server via the VM monitor module/engine. For illustrative purposes, in the description below, the VM monitor module/engine comprises a hypervisor module/engine 211 (e.g., $211_0$, $211_1$, $211_2$). In other embodiments, however, a different type of VM monitor module/engine may be used other than the hypervisor module/engine.

The host server system may contain and execute a VM manager module/engine 280 that produces a single VM request queue 282. In the embodiments described below, the VM request queue 282 comprises a queue. In other embodiments, however, the VM request queue 282 may comprise any data structure (table, list, etc.). In some embodiments, the VM manager module/engine 280 comprises a parameter interface 278. In some embodiments, VM parameters are received from an administrator/user through the parameter interface 278.

In some embodiments, the received VM parameters include a total number of VMs to be produced across the plurality of target servers in the virtual server environment. In some embodiments, the VM parameters do not specify a predetermined number of VMs to be produced for any specific server (static VM allocation). In some embodiments, the VM parameters specify only a total number of VMs to be produced across all the target servers, with no indication as to which target server will host which VMs or what number of VMs. For example, the VM parameters may specify only that a total of 200 new VMs be produced across three target servers. The VM parameters may further include data specifying/describing each VM to be produced, wherein the data regarding a VM does not specify a specific target server on which the VM is to be allocated and produced. As such, each specified VM may be produced on any of the target servers in the plurality of target servers. Rather, a total number of VMs and data describing the VMs to be produced across the target servers is received, and the number of VMs ultimately produced on each target server is dynamically determined based on the performance capabilities of each target server.

In some embodiments, the VM manager module/engine 280 is configured for producing a single VM request queue 282 capable of being accessed by any of the plurality of target servers 110. The VM request queue 282 may be produced and stored on the host server. More specifically, the VM request queue may be configured for being accessible by a plurality of processing threads (e.g., threads $290_1$, $290_2$) executing on the plurality of target servers 110. The contents of the VM request queue comprises a plurality of VM entries/VM requests representing the plurality of VMs to be produced across the plurality of target servers and contain data describing the VMs. In some embodiments, a VM request does not specify any specific target server on which the represented VM is to be allocated and produced. As such, a VM request is configured such that it may be processed by any processing thread plurality of processing threads for producing a VM on any target server in the plurality of target servers depending on which processing thread of which assigned target server retrieves the VM request from the VM request queue.

A processing thread 290 may be produced and assigned for each target server and execute on the corresponding assigned target server to produce VMs 212 only on the assigned target server. Producing a processing thread 290 for each target server may be accomplished via a variety of techniques. In some embodiments, the VM manager module 280 may produce, or cause to be produced, a processing thread 290 corresponding to each target server. In some embodiments, the VM manager module 280 instructs or requests to each target server (e.g., the operating system or hypervisor 211 of the target server) to produce a processing thread 290 and the target server produces the processing thread 290 for its own use.

Each processing thread may be configured for accessing and retrieving VM entries/requests from the shared single VM request queue and producing VMs on the corresponding target server according to the retrieved VM entries/requests. Each processing thread 290 may be configured for retrieving VM requests and producing VMs as rapidly as possible without any programmed delays (e.g., waiting for other processing threads from other target servers, etc.). In some embodiments, the processing thread may produce the VMs with assistance from the hypervisor module/engine on the same target server. For example, the processing thread may submit a request to the hypervisor module to produce a VM on the target server. As such, the speed or rate at which VMs are produced on a target server are a function of the speed or rate the target server can actually execute (in "real-world" settings) the processing thread to retrieve VM requests from the VM request queue and execute the processing thread and hypervisor module to produce the VMs. Thus, the final number of VMs produced on a particular target server (after all VM requests from the VM request queue are processed by the servers) is dependent on and is a function of the rate that the server can retrieve VM requests from the VM request queue and produce the VMs.

As such, as described herein, the rate at which a target server (executing a processing thread and hypervisor module) produces VMs on the target server will largely be a function of the "real-world" performance capabilities of the target server, whereby target servers having relatively higher/faster performance capabilities (e.g., newer servers, or servers under less load, or servers with more resources) will naturally have more VMs produced on them by its corresponding processing thread than target servers having relatively lower/slower performance capabilities (e.g., servers under heavy load, running a large number of legacy VMs, or servers with fewer resources). This dynamic allocation of VMs based on such a "natural selection" technique may provide an appropriately balanced allocation of VMs across a plurality of target servers based on the actual "real-world" performance capabilities of each target server.

A processing thread 290 may produce a VM 212 through a system request to its hypervisor module/engine 211 to produce the VM only on the same target server. For example, a first processing thread $290_1$ executing on a first target server system $110_1$ may retrieve a VM request from the VM request queue 282 stored on host/target server system $110_0$, and request, via a first hypervisor $211_1$, the creation and configuration of a VM 212 hosted on the first target server system $110_1$. The first processing thread $290_1$ then immediately retrieves the next VM request from the VM request queue 282 (without any programmed or configured delay) to produce a next VM 212 on the first target server system $110_1$. Concurrently, a second processing thread $290_2$ executing on a second target server system $110_2$ may retrieve a VM request from the VM request queue 282 stored on host/target server system $110_0$, and request, via a second hypervisor $211_2$, the creation and configuration of a VM 212 hosted on the second target server system $110_2$. The second processing thread $290_2$ then immediately retrieves the next VM request from the VM request queue 282 (without any programmed or configured delay) to produce a next VM 212 on the second target server system $110_2$.

As such, each processing thread $290_1$ and $290_2$ continues to retrieve VM requests from the VM request queue 282 and produce VMs in parallel and as rapidly as possible (at a rate determined by the real-world performance capabilities of each target server) until there are no more VM requests in the VM request queue. Thus, the number of VMs 212 ultimately produced on each target server may vary, depending on the performance capabilities of each target server. In the example shown in FIG. 2A, there are twice as many VMs produced on the first target server system $110_1$ (e.g., VM4, VM5, VM6, VM7, VM8, and VM9) as the number of VMs produced on second server system $110_2$ (e.g. VM10, VM11, VM12). This indicates that the first target server system $110_1$ has greater performance capabilities compared to the second target server system $110_2$. Performance capabilities of a server may be a function of a wide variety of factors (e.g., loading, device I/O characteristics, etc.) that may be complex and difficult to model or predict accurately (as attempted in static VM allocation).

Figure 2B:
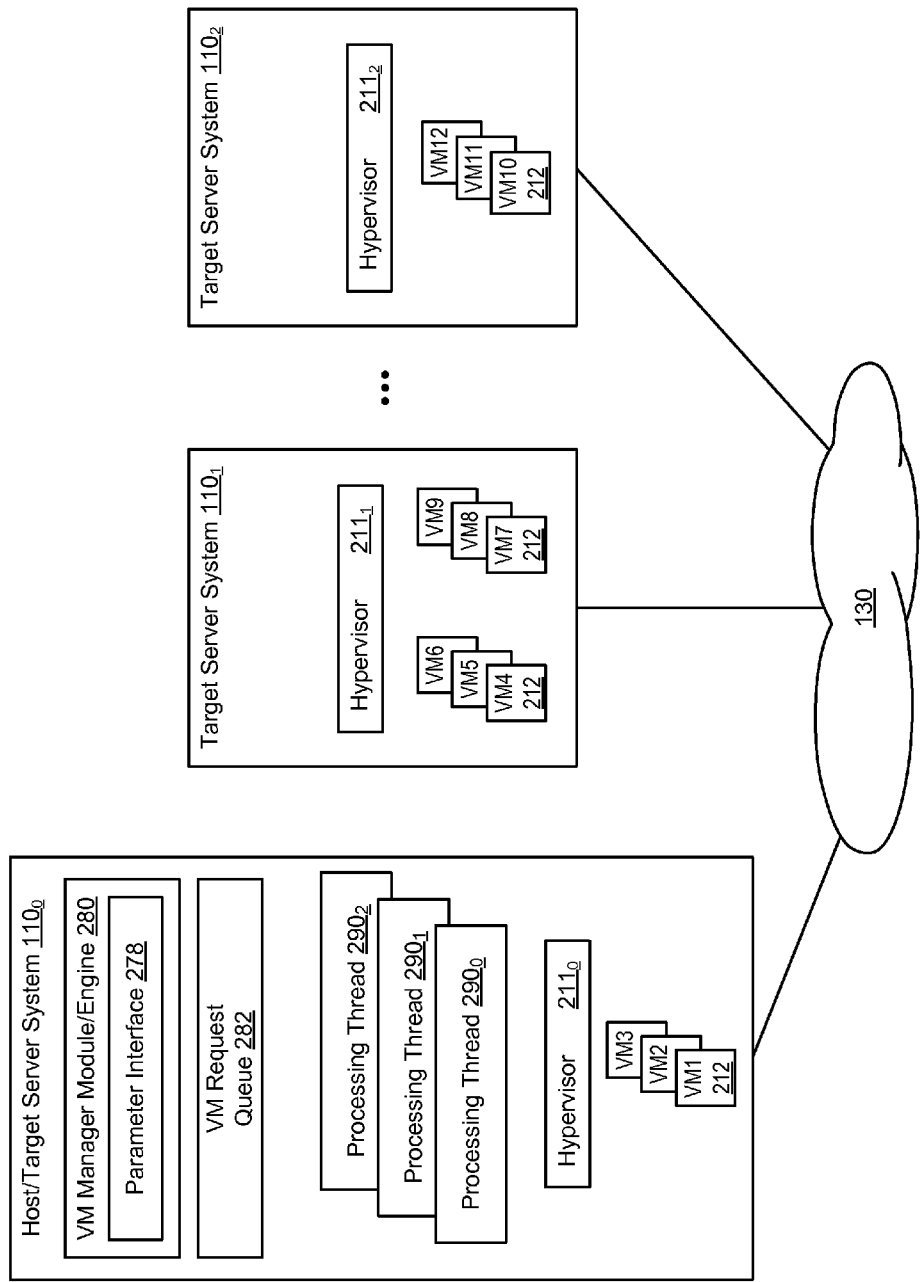
FIG. 2B shows a conceptual diagram of components of a host server and target servers within a virtual server environment, in accordance with alternative embodiments.

FIG. 2B is a diagram illustrating a system of various components of a host/target server system $110_0$ and target server systems $110_1$, and $110_2$, in accordance with alternative embodiments. As shown in FIG. 2B, the host/target server system $110_0$ and the two target server systems $110_1$ and $110_2$ are in communication over network 130. As such, any component shown within any of the host/target server systems $110_0$, and/or within any of the two target server systems $110_1$ and $110_2$, may be in communication with one another over network 130.

Each target server 110 may include a VM monitor module/engine 211 (e.g., $211_0$, $211_1$, $211_2$) that executes on the target server 110 to work in conjunction with an assigned processing thread 290 (e.g., $290_1$ and $290_2$) to produce VMs 212 (e.g., VM4, VMS, . . . VM12) on the target server. The VM monitor module/engine 211 may also manage the VMs 212 and virtualize the hardware and/or software resources of the servers for use by the VMs 212. The operating system of each VM may utilize and communicate with the resources of the server via the VM monitor module/engine. For illustrative purposes, in the description below, the VM monitor module/engine comprises a hypervisor module/engine 211 (e.g., $211_0$, $211_1$, $211_2$). In other embodiments, however, a different type of VM monitor module/engine may be used other than the hypervisor module/engine.

In some embodiments, the VM manager module/engine 280 is configured for producing a single VM request queue 282 capable of being accessed by any of the processing threads. More specifically, the VM request queue may be configured for being accessible by a plurality of processing threads (e.g., threads $290_0$, $290_1$, $290_2$) executing on the host server system $110_0$. The contents of the VM request queue comprises a plurality of VM entries/VM requests representing the plurality of VMs to be produced across the plurality of target servers and contain data describing the VMs. As such, a VM request is configured such that it may be processed by any processing thread from among a plurality of processing threads (e.g., threads $290_0$, $290_1$, $290_2$) for producing a VM on any target server in the plurality of target servers depending on which processing thread retrieves the VM request from the VM request queue. In these embodiments, each processing thread 290 may be assigned to a particular hypervisor of a particular target server and may be "paired" in a one-to-one relationship with the particular hypervisor 211.

In the embodiment of FIG. 2B, a processing thread 290 may be produced by the host server and paired to communicate with a particular assigned hypervisor 211 that executes on a target server to produce VMs 212 only on the target server upon which the hypervisor is executing. Each processing thread may be configured for accessing and retrieving VM entries/requests from the shared single VM request queue and producing VMs on the corresponding target server according to the retrieved VM entries/requests. Each processing thread 290 may be configured for retrieving VM requests and work in conjunction with a hypervisor for producing VMs as rapidly as possible without any programmed delays (e.g., waiting for other processing threads from other target servers, etc.). In the example of FIG. 2B, a processing thread may produce the VMs with assistance from the paired hypervisor module/engine on an assigned target server. For example, the processing thread may submit a request to its paired hypervisor module to produce a VM on the assigned target server, whereby the paired hypervisor receives VM requests from the paired processing thread. As such, the speed or rate at which VMs are produced on a target server are a function of the speed or rate the target server can actually execute (in "real-world" settings) the hypervisor engine to receive and execute/perform VM requests from the paired processing thread. Thus, in this embodiment, the final number of VMs produced on a particular target server (after all VM requests from the VM request queue are processed by the servers) is dependent on and is a function of the rate that the target server can execute the hypervisor to receive and execute/perform VM requests from its paired processing thread.

As such, in these embodiments, the rate at which a target server (executing a hypervisor module/engine) produces VMs on the target server will largely be a function of the "real-world" performance capabilities of the target server, whereby target servers having relatively higher/faster performance capabilities (e.g., newer servers, or servers under less load, or servers with more resources) will naturally have more VMs produced on them by its corresponding processing thread than target servers having relatively lower/slower performance capabilities (e.g., servers under heavy load, running a large number of legacy VMs, or servers with fewer resources). This dynamic allocation of VMs based on such a "natural selection" technique may provide an appropriately balanced allocation of VMs across a plurality of target servers based on the actual "real-world" performance capabilities of each target server.

Figure 3:
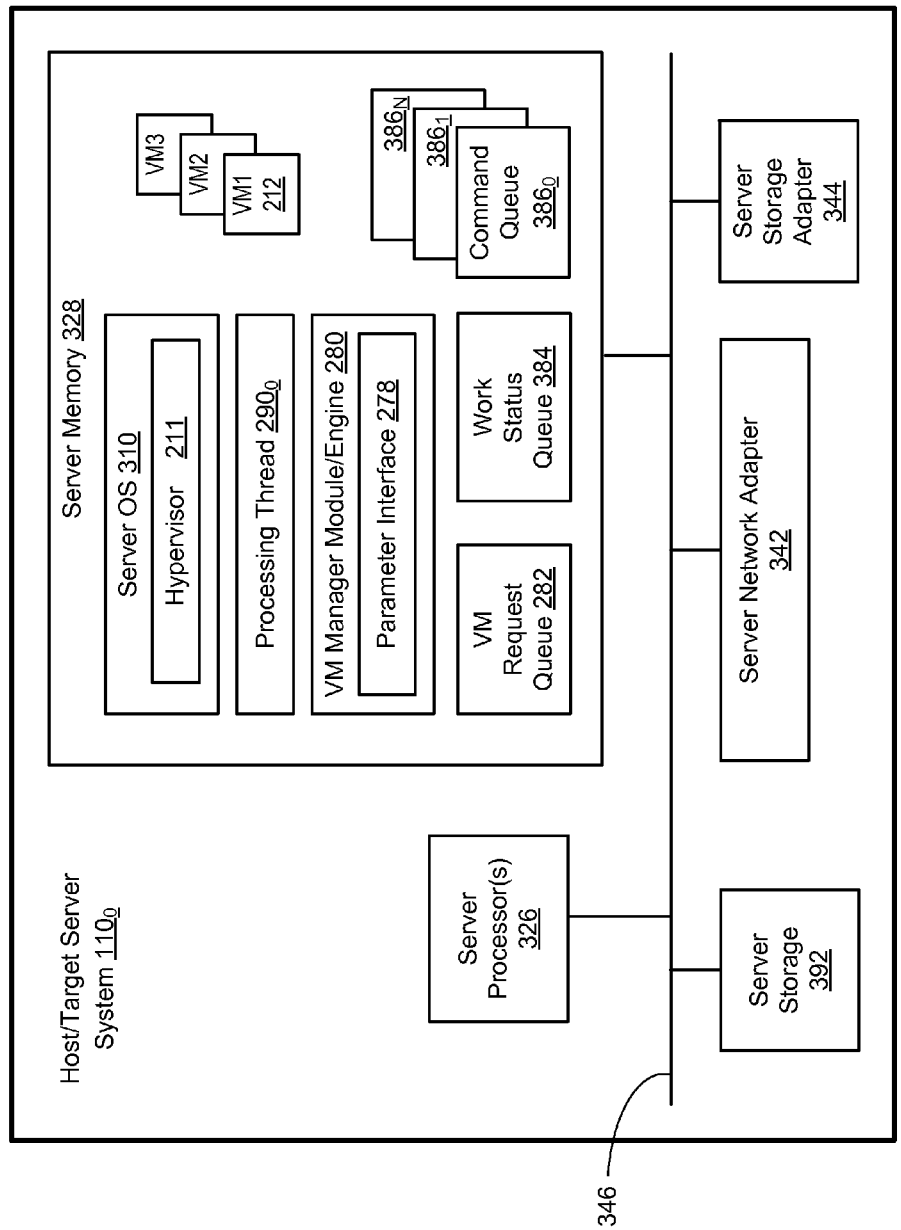
FIG. 3 is a diagram illustrating various components of a host server within a virtual server environment, in accordance with some embodiments.

FIG. 3 is a diagram illustrating components of a combination host/target server system 110 within a virtual server environment. FIG. 3 may also show the components of host server system 110 or a target server system 110. The components may contribute to the performance capabilities a particular server. As shown in FIG. 3, a server system 110 may comprise one or more server processor(s) 326, server memory 328, one or more server network adapters 342, one or more server storage adapters 344, server storage 392, and other devices or peripherals (not shown) coupled to the processor by a bus 346.

The server processors are the central processing units (CPUs) of the server system 110 and, thus, control the overall operation of the server system 110. Server processors may include one or more programmable general-purpose or special-purpose microprocessors, digital signal processors (DSPs), programmable controllers, application specific integrated circuits (ASICs), programmable logic devices (PLDs), or the like, or a combination of such devices.

A server network adapter 342 may comprise mechanical, electrical, and signaling circuitry needed to connect the host server system 110 to the network and to receive and transmit data over the network. The server network adapter 342 may comprise a network port controller (e.g., Ethernet cards), specialized network adapters, or any other physical device that controls the receiving and transmitting of data over a network. A server network adapter 342 may provide one or more network ports (i.e., data-access ports) for coupling the host server system 110 to one or more other client systems 105 through a network 125. A connection with a client system 105 may be established using a network port of the server network adapter 342 to receive and transmit data though the network 125.

Server memory 328 comprises storage locations that are addressable by the processor and adapters (e.g., a server network), as well as other devices for storing software program code such as the software described herein. The server processor and server adapters may, in turn, comprise processing elements and/or logic circuitry configured to execute the software code. Server memory 328 can be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

Server memory 328 is for storing software program instructions and data structures such as a server operating system 310 (having a hypervisor module 211), a VM manager module/engine 280, a VM request queue 282, a processing thread $290_0$, and one or more virtual machines 212 (as described above). The server operating system 310 and hypervisor 211 may be, for example, VMware™ ESX, Microsoft™ Hyper-V, Microsoft™ Virtual Server, NetApp SnapShot™, NetApp SnapMirror™, Citrix XenServer™, UNIX®, Windows NT®, Linux®, or any other operating system and hypervisor capable of producing and configuring one or more virtual machines. The server memory 328 may further comprise a work status queue 384 and command queues $386_0$-$386_N$ produced and used by the VM manager module/engine 280 for dynamically allocating VMs (as described below). A server system 110 loads information, instructions, parameters, and data structures into server memory 328 from which they are accessed and executed or processed by server processors 326 via a bus 346.

A. VM Manager Module/Engine

In some embodiments, a host server system 110 may store (in server memory 328) and execute a VM manager module/engine 280. The VM manager module/engine 280 may be configured to operate in conjunction with other server systems 110 and/or client systems to collectively perform the embodiments described herein. In other embodiments, the VM manager module/engine 280 may comprise a software module or engine that resides and executes outside the host server operating system 310. In further embodiments, the VM manager module/engine 280 may comprise a software module or engine that resides and executes outside the host server 110 (e.g., resides and executes on the storage system 120 or a client system 105). Also, any constituent component of the VM manager module/engine 280 (e.g., a VM request queue 282, a work status queue 384, or any command queue $386_0$-$386_N$) may also be stored and reside outside the host server system 110.

The VM manager module/engine 280 may receive VM parameters via a parameter interface 278. In some embodiments, the parameters are received from an administrator/user via the parameter interface 278. In some embodiments, the parameter interface 278 comprises a user interface such as a graphical user interface or command line interface. In other embodiments, the VM parameters may be received from a program through the parameter interface 278, which comprises a program interface such as an application program interface (API). The VM parameters may include a total number of VMs to be produced across the plurality of target servers in the virtual server environment.

B. VM Manager Module/Engine Queues

The VM manager module/engine 280 may be configured to produce and maintain various queues for performing embodiments herein. In the embodiments described below, the VM manager module/engine 280 may produce and maintain queues. In other embodiments, however, the VM manager module/engine 280 may produce and maintain other data structures (table, list, etc.) rather than queues. Specially, the VM manager module/engine 280 may produce and maintain a single VM request queue 282, a work status queue 384, and a plurality of command queues $386_0$-$386_N$ (whereby one command queue is produced for each target server system).

C. Processing Threads

The VM manager module/engine 280 may produce, or cause to be produced, a plurality of processing threads $290_0$-$290_N$, one processing thread for each target server system $110_0$-$110_N$. In some embodiments, the VM manager module 280 instructs or requests to each target server (e.g., the operating system or hypervisor 211 of the target server) to produce a processing thread 290 and the target server produces the processing thread 290 for its own use. Each processing thread 290 may be configured to perform queue input/output operations (e.g., push or pop operations) on any of the aforementioned queuing data structures. Each processing thread may retrieve VM requests from the VM request queue (thereby popping VM requests off the VM request queue) and submit the VM requests to the hypervisor 211 within its corresponding target server. The concurrent execution of processing threads enables multiple VMs to be requested to corresponding hypervisors 211, and thereby the VMs may be produced and configured in parallel.

Since each processing thread 290 executes on a target server system having particular performance characteristics, the rate at which a particular processing thread is able to retrieve/pop VM requests from the single VM request queue 282 is at least partially dependent on the performance characteristics of the corresponding target server system. Therefore, the faster target server systems (e.g., the target server systems that may be under less load, or the target server systems with more resources) are able to produce and configure a greater number of new VMs as compared to slower target server systems (e.g., the target server systems that may be busy running legacy VMs, or the servers with fewer resources, etc.). Moreover, concurrent creation and configuration of some finite number of virtual machines tends to be faster than creation of the same finite number of virtual machines using non-concurrent techniques.

D. Invoking VM Allocation

The invocation of the VM manager module/engine 280 for allocating VMs may be performed upon administrative command for many purposes. For example, when a software component is to be upgraded in a virtual desktop environment, all desktop virtual machines might be shut down, followed by creation of a new, updated set of virtual desktop machines configured with the upgraded software component(s). As another example, an additional storage system 120 might be added to the environment 100, and accordingly a group of virtual machines might be produced and configured for performing access requests (configuration and/or read/write access requests) to the new storage system for accessing particular data stored on the new storage system.

The configuration characteristics of a group of virtual machines might be identical for each VM within that group (e.g., mount volume "A"), or it might involve techniques for dynamically managing various resource types, logical access paths, and relationships among different storage environment components. In some environments, storage-centric load balancing may be managed dynamically in terms of input/output (I/O) traffic and storage utilization, and information aggregated over time may be used to identify and correct load imbalances in a virtual server environment in order to prevent storage congestion and bottlenecks.

In embodiments, a VM manager module/engine 280 is configured for receiving VM parameters specifying a total number of VMs to be produced across the plurality of servers, wherein the VM parameters do not specify a number of VMs to be produced on a specific server. For example, an administrator may want to standardize some portion of the company's workforce (e.g., say 2000 users at a particular site) to use only desktop machines running a particular software configuration. In such a case, the IT manager might construct parameters—consisting only of a list of user identifiers and some standard configuration parameters (e.g., mount volume "A" for each user and provide each user with 10 GB of user storage space)—and then invoke a VM manager module/engine 280 providing merely the aforementioned parameters. The parameters specify a total number of VMs to be produced across the plurality of servers (and an associated user identifier), but noting that the VM parameters do not specify a number of VMs to be produced on a specific server. Instead, the VM manager module/engine 280, the single VM request queue 282, the single work status queue 384, the command queues $386_0$-$386_N$, and the processing threads $290_0$-$290_N$ serve to automatically balance the number of VMs produced and configured on each target server by virtue of the load balancing resulting from the relative performance profiles of the target servers.

E. VMs and Client Systems

Figure 4:
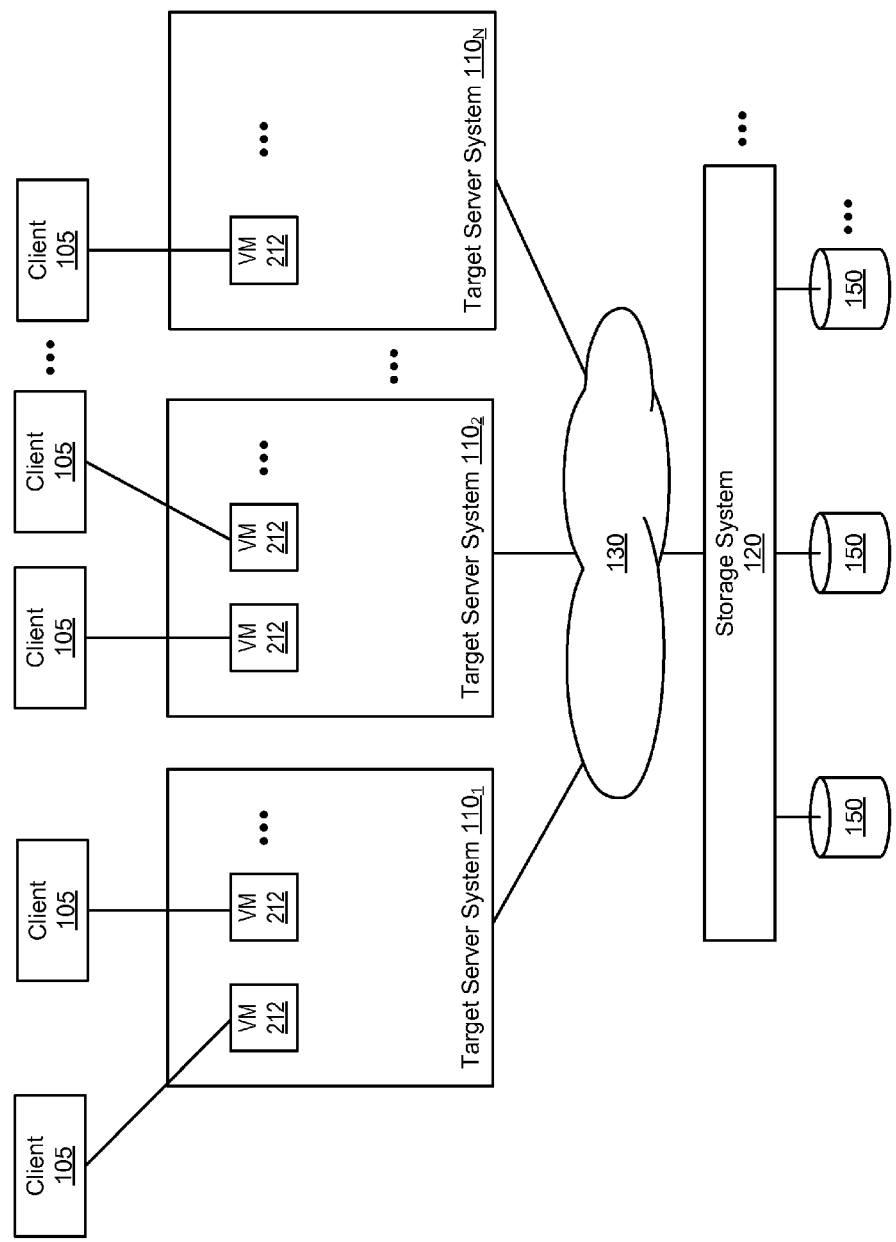
FIG. 4 shows a conceptual diagram of the allocation of VMs to target servers, in accordance with some embodiments.

FIG. 4 shows a conceptual diagram of the state of three target server systems $110_1$, $110_2$, and $110_N$, each of which, after invocation and execution of a VM manager module/engine 280, might then host/serve a different number of VMs 212 that were produced based on the performance capabilities of each target server. The virtual server environment may also include a plurality of client systems 105 connected with each target server 110 for accessing client data stored on the storage devices 150 of the storage system 120. Each client 105 may connect and interact with a particular VM 212 of a target server 110 to access the storage system 120. From the viewpoint of a client 105, the VM 212 may comprise a virtual server that appears and behaves as an actual physical server.

F. Processing VM Requests from the VM Request Queue

Figure 5:
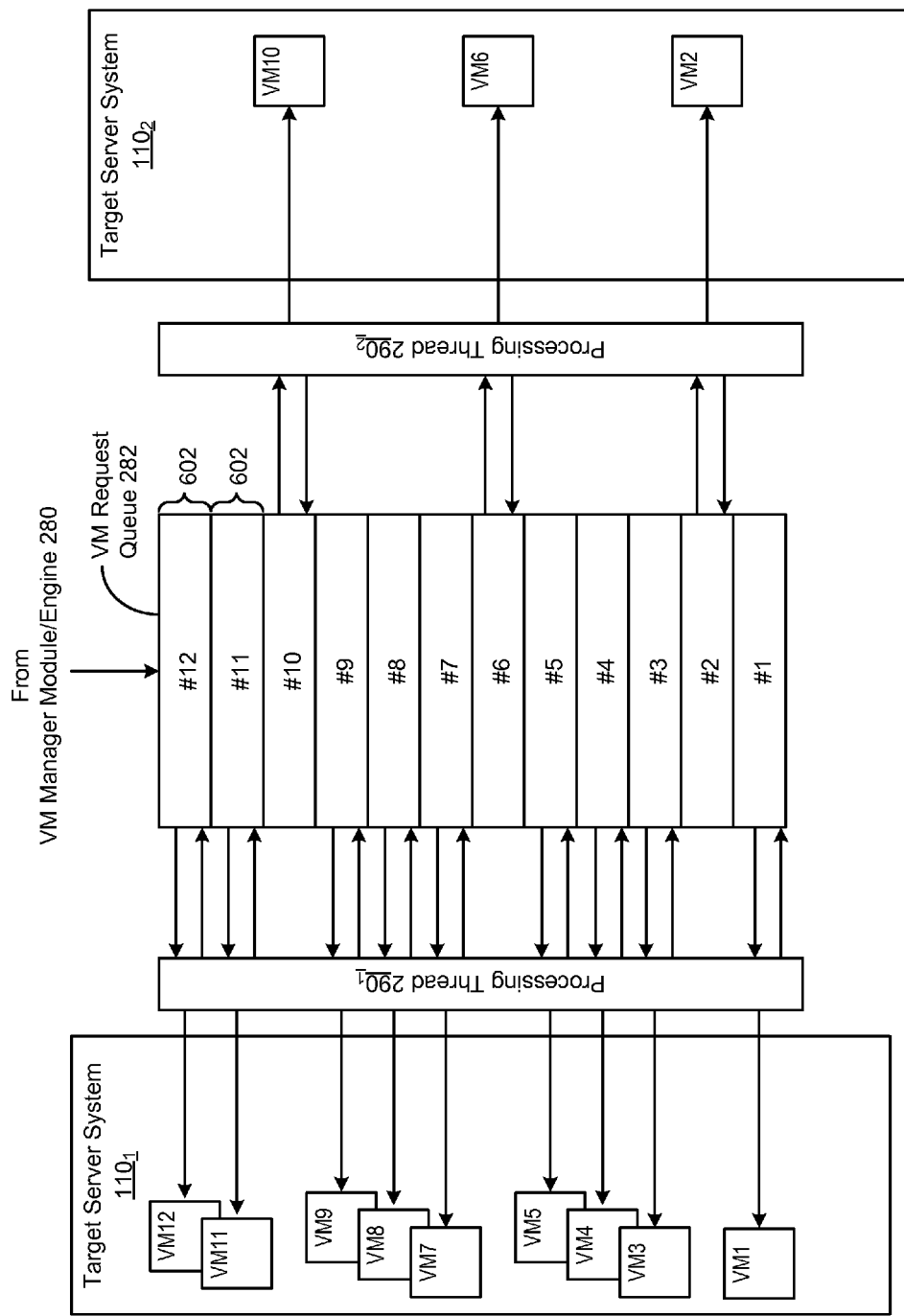
FIG. 5 shows a conceptual diagram of a VM request queue and processing threads within a virtual server environment, in accordance with some embodiments.

FIG. 5 shows a conceptual diagram of data flow between processing threads $290_1$ and $290_2$ and a single VM request queue 282, in accordance with some embodiments. The VM manager module/engine 280 may produce and populate the VM request queue 282 with a plurality of VM entries/VM requests 602 that represent the VMs to be allocated and produced on the target servers. The VM request queue 282 may be configured for pop access by each processing thread $290_1$, $290_2$.

The total number of VMs to be produced may be specified by a VM parameter received through the parameter interface 278. Information regarding each VM to be produced may also be specified in VM parameters received through the parameter interface 278. For each specified VM, the VM manager module/engine 280 may produce a VM entry/VM request 602 representing the VM and containing the received information regarding the VM. In some embodiments, each VM request 602 specifies a VM that may be produced on any of the plurality of target servers and does not specify the VM for being produced on a specific target server in the plurality of target servers. Rather, any particular VM produced and configured on any particular target server system is produced using dynamic VM allocation. The single VM request queue and its VMs requests 602 may be accessible by the plurality of processing threads (e.g., processing threads $290_1$, $290_2$).

Once a processing thread 290 has been produced and configured, and is operational for producing VMs on an assigned target server 110, each processing thread 290 may iteratively execute a processing loop comprising retrieving a VM request 602 from the VM request queue (thereby popping the retrieved VM request off the VM request queue), processing the VM request (in conjunction with hypervisor 211) to produce a VM 212 on the target server, and then returning to the VM request queue for retrieving another VM request 602 as rapidly as possible without any programmed delays. A processing thread continues executing in this processing loop until there are no more VM requests in the VM request queue 282 or is signaled to stop by the VM manager module/engine 280. Any number of processing threads (in the example of FIG. 5, two threads) execute in their respective processing loops substantially concurrently, although each processing thread and hypervisor may be hosted on a target server of varying performance capabilities, and thus may operate at different rates of speed.

In the two-thread example described herein in relation to FIG. 5, operations of processing threads 290 are shown conceptually as arrowed lines. In the two-thread example, a first processing thread $290_1$ retrieves a first VM request #1 (and accordingly performs a pop operation on VM request #1) from the VM request queue 282. Next, while the first processing thread $290_1$ is producing and configuring a first virtual machine VM1 (based on the information in first VM request #1) on a first target server $110_1$, a second processing thread $290_2$ retrieves a second VM request #2 (and accordingly performs a pop operation on VM request #2) from the VM request queue 282 and begins producing and configuring a second virtual machine VM2 (based on the information in second VM request #2) on a second target server $110_2$.

In this example, the first processing thread $290_1$ executes on the first target server system $110_1$ that is significantly more performance capable (e.g., hosts a significantly faster processor) than the second target server system $110_2$ that executes the second processing thread $290_2$. Thus, while the second processing thread $290_2$ is still producing and configuring virtual machine VM2, the first processing thread $290_1$ retrieves and processes three more VM requests #3, #4, and #5 from the VM request queue 282 to produce three more VMs (VM3, VM4, and VM5) on the first target server system $110_1$.

After completing producing and configuring virtual machine VM2 on the second target server system $110_2$, the second processing thread $290_2$ retrieves and begins processing VM request #6 from the single VM request queue 282. In the meantime, the first processing thread $290_1$ retrieves and processes VMs requests #7, #8, and #9 before the second processing thread $290_2$ is able to retrieve and begin processing VM request #10. In the meantime, the first processing thread $290_1$ retrieves and processes VMs requests #11 and #12. The processing threads 290 continue such operations until there are no more VM requests in the VM request queue 282 or is signaled to stop by the VM manager module/engine 280. As shown in the example of FIG. 5, the first target server $110_1$ having greater real-world performance capabilities will ultimately produce and host more VMs 212 than the second target server $110_2$.

G. Contents of a VM Entry/VM Request

Figure 6:
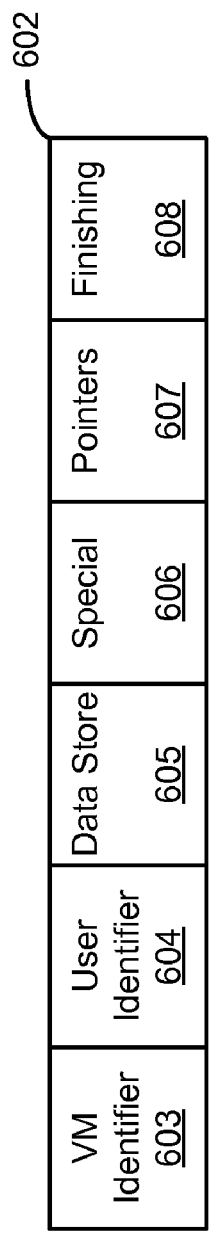
FIG. 6 shows a conceptual diagram of contents of a VM request queue entry, in accordance with some embodiments.

FIG. 6 shows a conceptual diagram of the contents of a VM entry/VM request 602 within a VM request queue 282. A VM request queue 282 is configured to contain any number of VM requests. A VM request 602 may comprise any form of data structure for storing data. Each VM request 602 represents a VM to be allocated and contains information/data used for producing and configuring the VM.

In the example shown, a VM request 602 may comprise an virtual machine identifier 603 (that identifies the VM to be produced and configured), a corresponding client/user identifier 604 (that identifies the client/user the VM represented by the VM request is configured for), storage configuration descriptors 605 (that specify storage system configurations for the identified client/user), a special field 606 for passing information between threads, a field for one or more pointers 607, and a field for containing any one or more finishing instructions 608. In some embodiments, not all fields are used, and the data representation for any of the fields 603-608 may depend wholly on implementation aspects. In some embodiments, although the exemplary VM request 602 does contain fields used for specifying a VM for producing on any target server, the VM request 602 does not contain any data or field (e.g., name, URL) for specifying any specific target server on which the VM is to be produced.

H. VM Manager Module Operations

Figure 7:
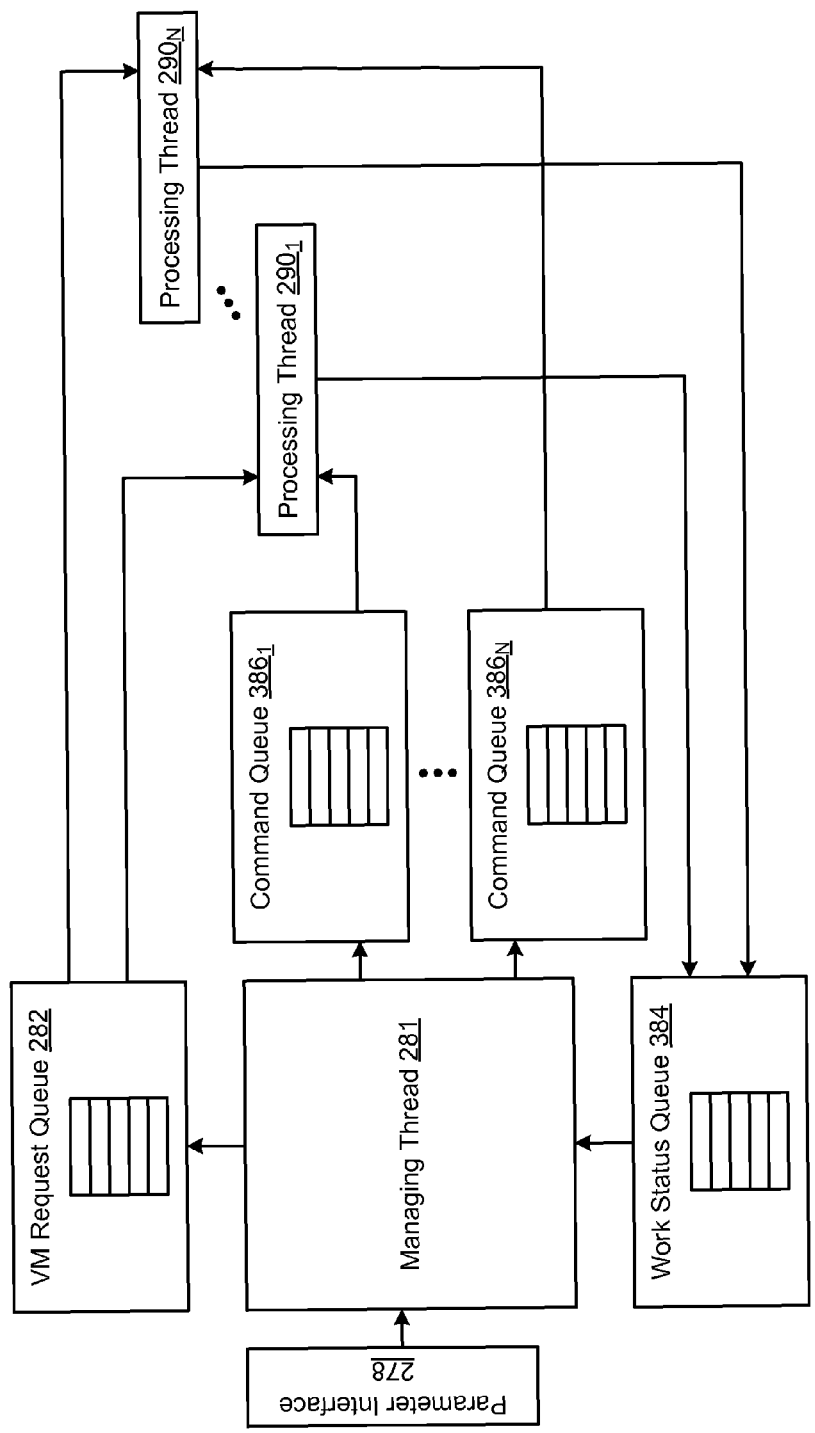
FIG. 7 shows a conceptual diagram of the operations of a VM manager module/engine and processing threads, in accordance with some embodiments.

FIG. 7 shows a conceptual diagram of the operations of a VM manager module/engine and processing threads, in accordance with some embodiments. In general, the VM manager module/engine may produce, or cause to be produced, various threads (e.g., managing thread, processing threads) and various data structures (e.g., VM request queue, command queues, etc.) for performing dynamic VM allocation among target servers.

As shown a parameter interface 278 provides inputs to a managing thread 281, which managing thread produces a single work status queue 384 configured for push access by each of the processing threads $290_1$-$290_N$, and configured for pop access by the managing thread 281. The managing thread 281 also produces one command queue $386_1$, $386_N$ for each processing thread $290_1$, $290_N$, and each command queue 386 is configured for pop access by its corresponding processing thread 290. Further, each command queue 386 is configured for push access by the managing thread 281. Additionally the managing thread 281 also produces one instance of a processing thread $290_1$-$290_N$ for each target server and hypervisor 211 able to produce virtual machines.

In operation, then, each processing thread $290_1$-$290_N$ pops VM requests off the VM request queue 282, processing the requests as fast as possible given the resource loading on the target server 110 upon which the processing thread 290 is executing. If an error occurs (e.g., insufficient resources to produce the requested VM) within a processing thread 290 while processing the VM request, the errant VM request can be placed back (i.e., pushed back) into the VM request queue 282 and thus made ready for any processing thread 290 to pop that VM request and attempt VM creation and configuration again. Depending upon the type of error, a processing thread 290 sleeps for a period of time before awakening and checking for entries in the single VM request queue 282. In some embodiments, a processing thread 290 may check the health of the hypervisor 211 before checking for entries in the single VM request queue 282. If the health of the hypervisor 211 is deemed to have improved such that the hypervisor 211 can again participate in the creation of virtual machines, the associated thread will again begin to pop requests off the VM request queue 282 again processing the requests as fast as possible. In some cases, the aforementioned error encountered by the processing thread 290 might be a transient error, and merely reprocessing the request—even if on the same server—may result in a successful VM creation and configuration.

Referring again to FIG. 5, and specifically to the single work status queue 384, this queuing data structure is used by each processing thread $290_1$-$290_N$ and is also used by the managing thread 281 for various finishing operations. As an example, after successful creation of a virtual machine on a target server 110, a processing thread $290_1$-$290_N$ will push the VM request onto the work status queue 384, thus indicating the successful creation and configuration of the virtual machine corresponding to the VM request. In due course, the managing thread 281 notices the presence of the VM entry on the work status queue 384 and thus performs any finishing operations applicable to the virtual machine corresponding to the VM request. Examples of finishing operations include applying of a customization specification, issuance of a power-on command, configuration of a storage export, and/or passing the VM request to another process. Such finishing operations to be performed, if any, are indicated in the at field for finishing instructions 608 of VM request 602.

The foregoing paragraphs discuss use of the work status queue 384 in the case that the intended creation and configuration of the virtual machine was successful; however, it may occur that one or more virtual machines that were popped from the single VM request queue 282 was not produced and configured as specified in the VM request. In such a case of incomplete or fatal virtual machine creation and configuration by any processing thread $290_1$, $290_2$, the corresponding processing thread pushes the VM request, possibly including any error code, onto the work status queue 384. When the managing thread 281 pops that VM request from the work status queue 384, the managing thread 281 determines appropriate next steps—possibly including pushing a VM request onto the VM request queue 282, or possibly handling the error in some other manner.

Conceptually, any thread may push into the VM request queue 282 and/or pop an entry off the VM request queue 282 using any of a variety of software techniques (e.g., Java methods for class 'queue', an API, a subroutine, a remote procedure call, etc.) for managing multiple thread access to a single queue. Returning now to FIG. 4, the system 400 exemplifies a virtual server environment with N server systems. Each of server systems $110_0$, $110_1$, $110_N$ are in communication with each other via a network 130 such as a local area network (LAN), an Ethernet subnet, a PCI or PCIe subnet, a switched PCIe subnet, a wide area network (WAN), a metropolitan area network (MAN), the Internet, or the like. That is, in some embodiments, the server systems $110_0$, $110_1$, $110_N$ may be co-located, possibly even in the same chassis, or they may be located in geographically distant locations. In some embodiments, multiple different technologies might be used for implementing the network 130. In one exemplary case, a plurality of target servers $110_1$-$110_N$ are situated within a single chassis (e.g., within a blade server chassis) communicating over a subnet that spans only within the chassis using a high-speed, low latency, short-haul backplane technology (e.g., a PCIe subnet or a switched PCIe subnet). The target servers $110_1$-$110_N$ then communicate to other components (e.g., the host server system $110_0$, the storage system 120, etc.) over a medium- or long-haul technology (e.g., Ethernet, gigabit Ethernet, Fibre Channel, etc.).

III. Methods for Dynamic VM Allocation in Virtual Server Environments

Figure 8:
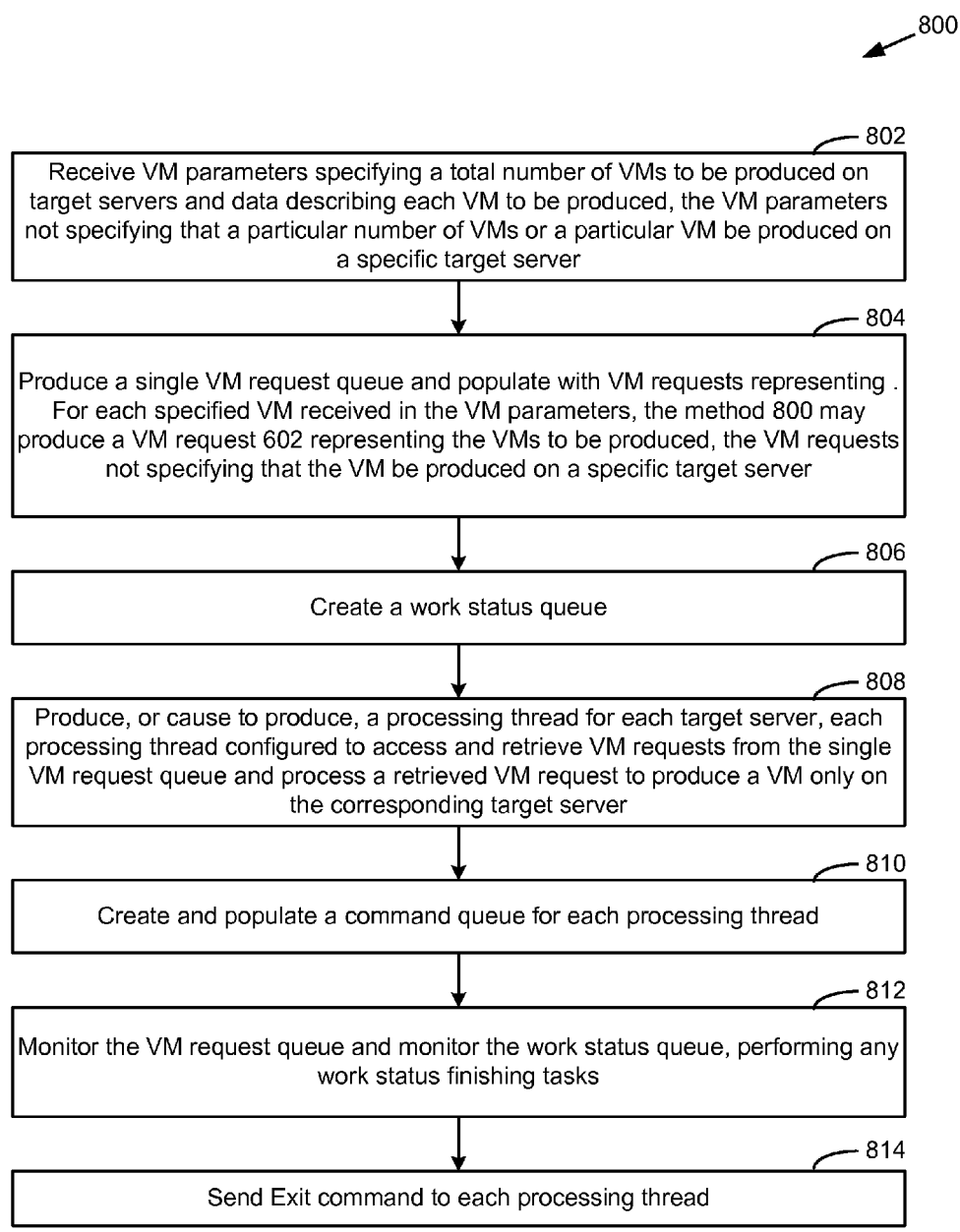
FIG. 8 shows a flowchart of operations of the VM manager module/engine, in accordance with some embodiments.
Figure 9:
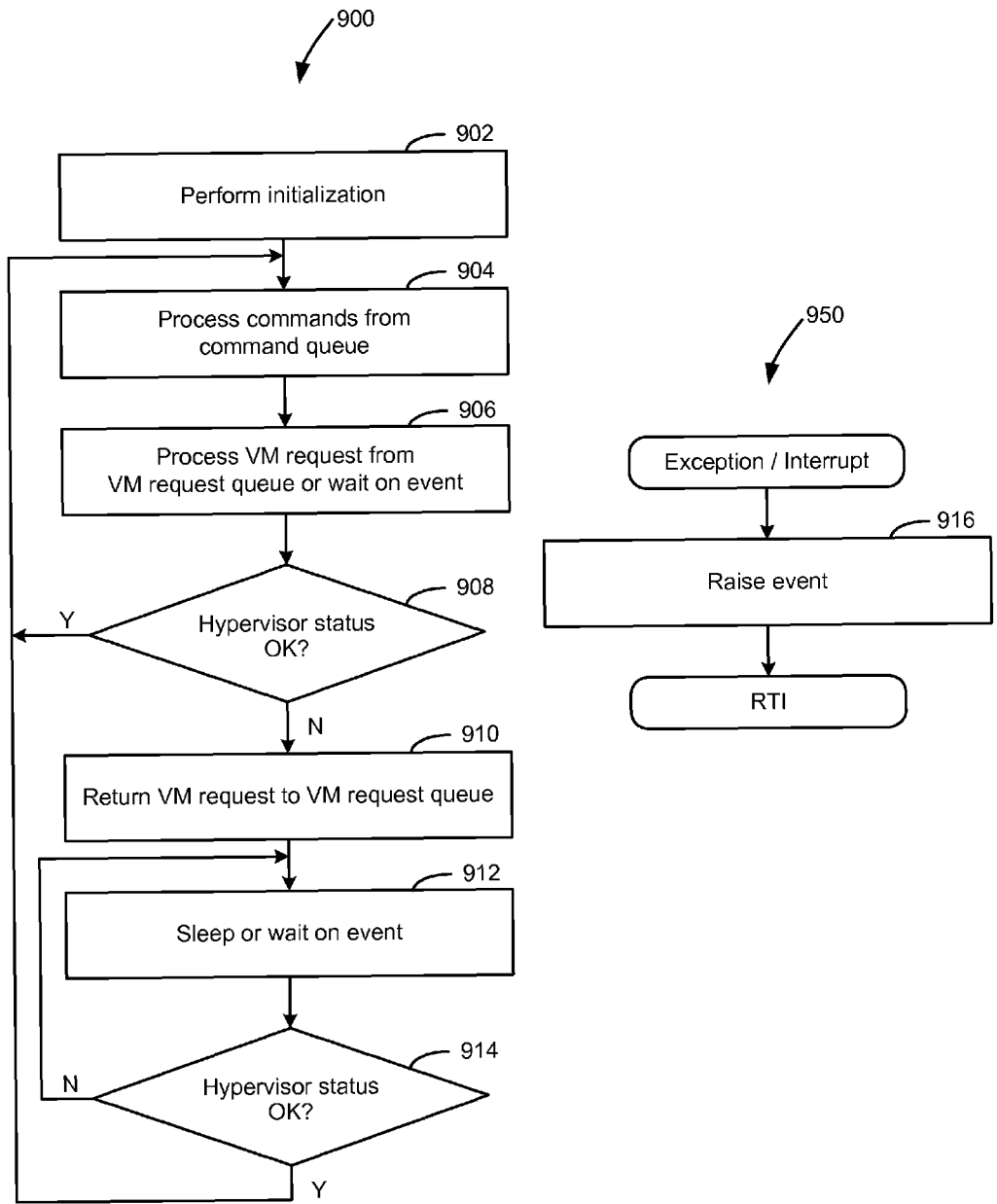
FIG. 9 shows a flowchart of operations of a processing thread, in accordance with some embodiments.

FIGS. 8-9 are flowcharts of methods for dynamic virtual machine allocation in a virtual server environment, in accordance with some embodiments. FIG. 8 shows a flowchart of a method for operations of a VM manager module/engine 280 or managing thread 281. In some embodiments, some of the steps of the method 800 are performed within a VM manager module/engine 280 executing on a host server 110. In some embodiments, initiation of method 800 and some steps of the method 800 are performed automatically, i.e., without human initiation, interaction, or intervention. The order and number of steps of the method 800 are for illustrative purposes only and, in other embodiments, a different order and/or number of steps are used.

The method 800 receives (at 802) VM parameters specifying a total number of VMs to be produced across the plurality of target servers, wherein the VM parameters do not specify a number of VMs to be produced on a specific target server. The VM parameters further include information/data describing each VM to be produced, wherein the information/data regarding a VM does not specify a specific target server on which the VM is to be allocated and produced.

The method 800 then produces (at 804) a single VM request queue being accessible by a plurality of processing threads and populates the VM request queue with a plurality of VM requests representing the VMs to be produced. For each specified VM received in the VM parameters, the method 800 may produce a VM request 602 representing the VM and containing the received information regarding the VM. In some embodiments, the VM requests do no specify the VM for being produced on a specific target server. Each VM request includes configuration details for any processing thread to be able to process the request.

The method 800 then produces (at 806) a work status queue being accessible by a plurality of processing threads. The method 800 then produces, or causes to produce (at 808) a processing thread for each target server, each processing thread configured to access and retrieve VM requests from the single VM request queue and process a retrieved VM request to produce a VM only on the corresponding target server. In some embodiments, the method 800 instructs or requests to each target server (e.g., the operating system or hypervisor 211 of the target server) to produce a processing thread 290 and the target server produces the processing thread 290 for its own use.

The method 800 produces (at 810) command queues, one for each produced processing thread. The command queue for a particular individual processing thread is used in cases described above, and also in cases where the particular individual processing thread must complete a specific activity on the target server upon which the particular individual processing is running. Such activities include, but are not limited to, attaching new storage, modifying system parameters, detaching storage, and refreshing a hypervisor 211's view of its storage. The managing thread of method 800 populates command queues with indications of such activities. In some cases, the activities may be explicitly listed or even in the fields of a VM request. At this point in execution of the managing thread of method 800, the processing threads are operable to process VM requests from the VM request queue (allocated and populated at 804).

As the threads process VM requests from the VM request queue they populate the work status queue with an indication of success (or error) of the request to produce a VM. Accordingly, the managing thread of method 800 begins to monitor the VM request queue and also monitor the work status queue, performing any work status finishing tasks (at 812). When all VM requests have been popped by the processing threads, and the processing threads have finished processing all items in the work status queue, the method 800 signals to the processing threads to exit by sending an exit command to each processing thread (at 814). The method 800 then ends.

FIG. 9 shows a flowchart of methods 900 and 950 of operations of a processing thread. In some embodiments, some of the steps of the processing thread of methods 900 and 950 are performed by each of the plurality of processing threads $290_1$-$290_N$ executing on a set of target server systems 110. In some embodiments, initiation of methods 900 and 950 and some steps of the methods 900 and 950 are performed automatically, i.e., without human initiation, interaction, or intervention. The order and number of steps of the methods 900 and 950 are for illustrative purposes only and, in other embodiments, a different order and/or number of steps are used.

As shown, the method 900 performs an initialization sequence (at 902). In some embodiments, the initialization sequence includes registering an interrupt service routine, and possibly also registering an exception handling routine. Once fully initialized, the method enters a loop (beginning at 904) and remains in the loop until a fatal error is encountered or until the processing thread of method 900 receives an exit command from the command queue 386. While in this loop, the processing thread of method 900 will check (at 904) for commands waiting in its command queue 386. If one or more commands are found waiting in its command queue 386, then one or more commands are processed. The processing thread of method 900 will then wait for VM requests to become available in the single VM request queue.

The processing thread of method 900 can be interrupted from any execution state by the managing thread of method 900. Such an interrupt will cause the exception/interrupt sequence of method 950 to execute and raise an event (at 916), thus causing the interrupted processing thread of method 900 to process the event. Similarly, if the processing thread of method 900 encounters an exception, it slows down execution (at 912) by going to sleep for a short time, or waits for an event to be raised by the exception/interrupt sequence of method 950. Once the event raised by the exception/interrupt sequence of method 950 has been processed by the processing thread of method 900, the processing thread of method 900 once again executes. After processing (at 906) a VM request retrieved from the single VM request queue 282, the health of the hypervisor 211 is checked (at 908). If the hypervisor 211 health is found to be degraded, the processing thread of method 900 can return the VM request corresponding to the unfinished request to the single VM request queue 282 (at 910). If the request is returned, the hypervisor 211 health is checked (at 914) before the thread will take any additional requests off the VM request queue. A hypervisor 211 status other than "OK" will cause the method to wait (at 912) before rechecking the health of the hypervisor 211.

Some embodiments may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module or software layer described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

I claim:

1. A system for dynamically producing virtual machines (VMs) on a plurality of servers, the system comprising:
a VM manager engine configured for:
receiving VM parameters specifying a plurality of VMs to be produced across the plurality of servers, wherein the VM parameters do not specify that a VM be produced on a specific server in the plurality of servers;
producing a single VM request queue for the plurality of servers, the VM request queue being accessible by a plurality of threads and comprising a plurality of VM requests for producing the plurality of VMs, each VM request specifying a VM for producing on the plurality of servers and not specifying the VM for producing on a specific server in the plurality of servers; and
producing a plurality of processing threads for the plurality of servers, each processing thread assigned to a server, each processing thread configured to access and retrieve VM requests from the single VM request queue and process a retrieved VM request for producing a VM only on the assigned server, wherein each VM request is configured for processing by any processing thread in the plurality of processing threads for producing a VM on any server in the plurality of servers depending on which processing thread retrieves the VM request from the VM request queue.

2. The system of claim 1, wherein the VM parameters further specify a total number of VMs to be produced across the plurality of servers, wherein the VM parameters do not specify a number of VMs to be produced on a specific server.

3. The system of claim 1, wherein:
each server comprises a server operating system; and
each VM produced on a server comprises a separate instance of a separate operating system and one or more applications that execute on the server.

4. The system of claim 1, further comprising:
a storage system connected with each server in the plurality of servers for storing client data; and
a plurality of client systems, each client system connected with a server and interfacing with a VM on a server to access client data of the storage system.

5. The system of claim 1, wherein each processing thread executes on its assigned server as rapidly as possibly allowed by the performance capabilities of its assigned server without any programmed delays for retrieving and processing VM requests.

6. The system of claim 1, wherein:
each processing thread executes on its assigned server; and
a number of VMs produced on an assigned server by a processing thread is dependent on the performance capabilities of the assigned server.

7. The system of claim 6, wherein more VMs are produced on a server having relatively faster performance capabilities than on a server having relatively slower performance capabilities.

8. The system of claim 1, wherein:
each processing thread executes on its assigned server; and
a number of VMs produced on a server by the assigned processing thread is dependent on the rate the server executes the assigned processing thread to retrieve and process VM requests.

9. The system of claim 1, wherein:
each server executes a VM monitor engine for producing and managing VMs on the server;
a processing thread assigned to a server submits VM requests to the VM monitor engine residing on the assigned server for producing VMs on the assigned server; and
a number of VMs produced on a server is dependent on the rate that the server can execute its VM monitor engine to produce VMs.

10. A method for dynamically producing virtual machines (VMs) on a plurality of servers, the method comprising:
receiving, at a VM manager engine, VM parameters specifying a plurality of VMs to be produced across the plurality of servers, wherein the VM parameters do not specify that a VM be produced on a specific server in the plurality of servers;
producing, using the VM manager engine, a single VM request queue for the plurality of servers, the VM request queue being accessible by a plurality of threads and comprising a plurality of VM requests for producing the plurality of VMs, each VM request specifying a VM for producing on the plurality of servers and not specifying the VM for producing on a specific server in the plurality of servers; and
producing, using the VM manager engine, a plurality of processing threads for the plurality of servers, each processing thread assigned to a server, each processing thread configured to access and retrieve VM requests from the single VM request queue and process a retrieved VM request for producing a VM only on the assigned server, wherein each VM request is configured for processing by any processing thread in the plurality of processing threads for producing a VM on any server in the plurality of servers depending on which processing thread retrieves the VM request from the VM request queue.

11. The method of claim 10, wherein the VM parameters further specify a total number of VMs to be produced across the plurality of servers, wherein the VM parameters do not specify a number of VMs to be produced on a specific server.

12. The method of claim 10, wherein:
each server comprises a server operating system; and each VM produced on a server comprises a separate instance of a separate operating system and one or more applications that execute on the server.

13. The method of claim 10, further comprising:
accessing a storage system connected with each server in the plurality of servers for storing client data; and
interfacing with a plurality of client systems, each client system connected with a server and interfacing with a VM on a server to access client data of the storage system.

14. The method of claim 10, wherein each processing thread executes on its assigned server as rapidly as possibly allowed by the performance capabilities of its assigned server without any programmed delays for retrieving and processing VM requests.

15. The method of claim 10, wherein:
each processing thread executes on its assigned server; and
a number of VMs produced on an assigned server by a processing thread is dependent on the performance capabilities of the assigned server.

16. The method of claim 15, wherein more VMs are produced on a server having relatively faster performance capabilities than on a server having relatively slower performance capabilities.

17. The method of claim 10, wherein:
each processing thread executes on its assigned server; and
a number of VMs produced on a server by the assigned processing thread is dependent on the rate that the server executes the assigned processing thread to retrieve and process VM requests.

18. The method of claim 10, wherein:
each server executes a VM monitor engine for producing and managing VMs on the server;
a processing thread assigned to a server submits VM requests to the VM monitor engine residing on the assigned server for producing VMs on the assigned server; and
a number of VMs produced on a server is dependent on the rate that the server can execute its VM monitor engine to produce VMs.

19. A system for dynamically producing virtual machines (VMs) on a plurality of servers, the system comprising:
a VM manager engine configured for:
receiving VM parameters specifying a plurality of VMs to be produced across the plurality of servers, wherein the VM parameters do not specify that a VM be produced on a specific server in the plurality of servers;
producing a single VM request queue for the plurality of servers, the VM request queue being accessible by a plurality of threads and comprising a plurality of VM requests for producing the plurality of VMs, each VM request specifying a VM for producing on the plurality of servers and not specifying the VM for producing on a specific server in the plurality of servers; and
producing a plurality of processing threads for the plurality of servers, each processing thread assigned to a server, each processing thread configured to access and retrieve VM requests from the single VM request queue and process a retrieved VM request for producing a VM only on the assigned server, wherein each processing thread is configured for retrieving VM requests and producing VMs without any programmed delays, whereby the rate at which a processing thread produces VMs on its assigned server is a function of the performance capabilities of the assigned server.

20. The system of claim 19, wherein more VMs are produced on a server having relatively faster performance capabilities than on a server having relatively slower performance capabilities.

21. A method for dynamically producing virtual machines (VMs) on a plurality of servers, the method comprising:
receiving, at a VM manager engine, VM parameters specifying a plurality of VMs to be produced across the plurality of servers, wherein the VM parameters do not specify that a VM be produced on a specific server in the plurality of servers;
producing, using the VM manager engine, a single VM request queue for the plurality of servers, the VM request queue being accessible by a plurality of threads and comprising a plurality of VM requests for producing the plurality of VMs, each VM request specifying a VM for producing on the plurality of servers and not specifying the VM for producing on a specific server in the plurality of servers; and
producing, using the VM manager engine, a plurality of processing threads for the plurality of servers, each processing thread assigned to a server, each processing thread configured to access and retrieve VM requests from the single VM request queue and process a retrieved VM request for producing a VM only on the assigned server, wherein each processing thread is configured for retrieving VM requests and producing VMs without any programmed delays, whereby the rate at which a processing thread produces VMs on its assigned server is a function of the performance capabilities of the assigned server.

22. The method of claim 21, wherein more VMs are produced on a server having relatively faster performance capabilities than on a server having relatively slower performance capabilities.

* * * * *